US009338368B2

(12) United States Patent  
Kasai (10) Patent No.: US 9,338,368 B2  
(45) Date of Patent: May 10, 2016

(54) IMAGING APPARATUS, METHOD OF DETECTING FLICKER, AND INFORMATION PROCESSING UNIT

(71) Applicant: SONY CORPORATION, Tokyo (JP)

(72) Inventor: Daisuke Kasai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/282,670

(22) Filed: May 20, 2014

(65) Prior Publication Data

US 2014/0354847 A1 Dec. 4, 2014

(30) Foreign Application Priority Data

May 29, 2013 (JP) ................................ 2013-112695

(51) Int. Cl.
| | |
|---|---|
| H04N 9/73 | (2006.01) |
| H04N 5/335 | (2011.01) |
| H04N 5/222 | (2006.01) |
| H04N 5/235 | (2006.01) |
| H04N 5/232 | (2006.01) |

(52) U.S. Cl.  
CPC ........... *H04N 5/2357* (2013.01); *H04N 5/2353* (2013.01); *H04N 5/23212* (2013.01)

(58) Field of Classification Search  
CPC . H04N 5/23296; H04N 5/235; H04N 5/2353; H04N 5/2357

USPC ............... 348/221.1, 226.1, 296, 308, 333.01  
See application file for complete search history.

(56) References Cited

U.S. PATENT DOCUMENTS

| | | | | | |
|---|---|---|---|---|---|
| 5,831,676 | A | * | 11/1998 | Takahashi | H04N 5/2351 348/229.1 |
| 5,847,756 | A | * | 12/1998 | Iura | H04N 5/2357 348/220.1 |
| 5,883,666 | A | * | 3/1999 | Kyuma | H04N 5/2351 348/220.1 |
| 2009/0128683 | A1 | * | 5/2009 | Matsumoto | H04N 5/2357 348/345 |
| 2011/0181753 | A1 | * | 7/2011 | Sugie | H04N 5/23296 348/226.1 |
| 2013/0258134 | A1 | * | 10/2013 | Ashida | H04N 5/2357 348/223.1 |

* cited by examiner

*Primary Examiner* — Trung Diep  
(74) *Attorney, Agent, or Firm* — Hazuki International, LLC (57) ABSTRACT

An imaging apparatus includes: an imaging device configured to convert light into an electric signal and to output the electric signal; an exposure control section configured to variably control an exposure period of the imaging device with use of an electronic shutter; and a flicker detection section configured to detect a flicker based on variation in an output signal from the imaging device when speed of the electronic shutter is varied from relatively-high speed to relatively-low speed.

9 Claims, 5 Drawing Sheets

IMAGING APPARATUS, METHOD OF DETECTING FLICKER, AND INFORMATION PROCESSING UNIT

CROSS REFERENCE TO RELATED APPLICATIONS

This application claims the benefit of Japanese Priority Patent Application JP 2013-112695 filed May 29, 2013, the entire contents of each which are incorporated herein by reference.

BACKGROUND

The present disclosure relates to an imaging apparatus that has an electronic shutter function, to a method of detecting a flicker in such an imaging apparatus, and to an information processing unit applicable to such an imaging apparatus.

As a type of electronic shutter in an imaging apparatus that includes an imaging device such as a CMOS (Complementary Metal-Oxide Semiconductor), a global shutter type and a rolling shutter type are known. An electronic shutter of the global shutter type performs an electronic shutter operation at the same time in all pixels. Therefore, when using the electronic shutter of the global shutter type, timings of exposure are the same in all pixels. An electronic shutter of the rolling shutter type performs the electronic shutter operation, for example, one horizontal line by one horizontal line. Therefore, when using the electronic shutter of the rolling shutter type, timings of exposure are shifted, for example, one horizontal line by one horizontal line.

In an imaging apparatus as that described above, for example, when a moving image is shot under a light source configured of an alternating-current power source such as a fluorescent lamp, a flicker may be caused by periodical variation in luminance of the light source depending on a relationship between frequency of the alternating-current power source and shutter speed of the electronic shutter in some cases. In particular, when a moving image is shot using the electronic shutter of the rolling shutter type, the timings of exposure are shifted, for example, one horizontal line by one horizontal line. Therefore, a flicker component periodically appears in a particular line, and therefore, lateral stripes are caused. Accordingly, there have been proposed some methods to detect such a flicker component. (See Japanese Unexamined Patent Application Publication No. H08-29864 (JPH08-29864) and No. 2004-7402 (JP2004-7402).)

SUMMARY

The imaging apparatus disclosed in JPH08-29864, a flicker is detected in a state where focusing is adjusted to be optimal for shooting. Therefore, when a moving image is shot by the electronic shutter of the rolling shutter type in particular, a flicker may be mistakenly detected in some cases, for example, when the imaging apparatus is tilted in a state where background has a stripe pattern. Also, the imaging apparatus in JPH08-29864 is specialized in detecting a flicker component resulting from frequency (60 Hz or 50 Hz) of the alternating-current power source. Therefore, it is difficult to detect a flicker component with high frequency resulting from a high-frequency light source such as an LED (Light Emitting Diode) which has been increasingly used in recent years.

Reference 2 proposes a method to suppress detection error of a flicker resulting from the background by detecting a flicker in a state where a focusing operation is adjusted to allow an image to be blurred in the imaging apparatus. However, also in the imaging apparatus disclosed in Reference 2, it is difficult to detect a flicker component with high frequency resulting from the high-frequency light source such as an LED.

It is desirable to provide an imaging apparatus, a method of detecting a flicker, and an information processing unit that are capable of improving accuracy in detection of a flicker.

According to an embodiment of the present disclosure, there is provided an imaging apparatus including: an imaging device configured to convert light into an electric signal and to output the electric signal; an exposure control section configured to variably control an exposure period of the imaging device with use of an electronic shutter; and a flicker detection section configured to detect a flicker based on variation in an output signal from the imaging device when speed of the electronic shutter is varied from relatively-high speed to relatively-low speed.

According to an embodiment of the present disclosure, there is provided a method of detecting a flicker, the method including: variably controlling an exposure period of an imaging device with use of an electronic shutter; and detecting a flicker based on variation in an output signal from the imaging device when speed of the electronic shutter is varied from relatively-high speed to relatively-low speed.

According to an embodiment of the present disclosure, there is provided an information processing unit including: an exposure control section configured to variably control an exposure period of an imaging device with use of an electronic shutter; and a flicker detection section configured to detect a flicker based on variation in an output signal from the imaging device when speed of the electronic shutter is varied from relatively-high speed to relatively-low speed.

In the imaging apparatus, the method of detecting a flicker, and the information processing unit according to the above-described embodiments of the present disclosure, a flicker is detected based on the variation in the output signal from the imaging device when the speed of the electronic shutter is varied from relatively-high speed to relatively-low speed.

According to the imaging apparatus, the method of detecting a flicker, and the information processing unit according to the above-described embodiments of the present disclosure, a flicker is detected by allowing the speed of the electronic shutter to be varied from high speed to lower speed. Therefore, it is possible to improve accuracy in detection of a flicker.

It is to be noted that the effects disclosed in the present specification are mere examples and the effects of the present disclosure are not limited thereto. Also, the present disclosure may have additional effects.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
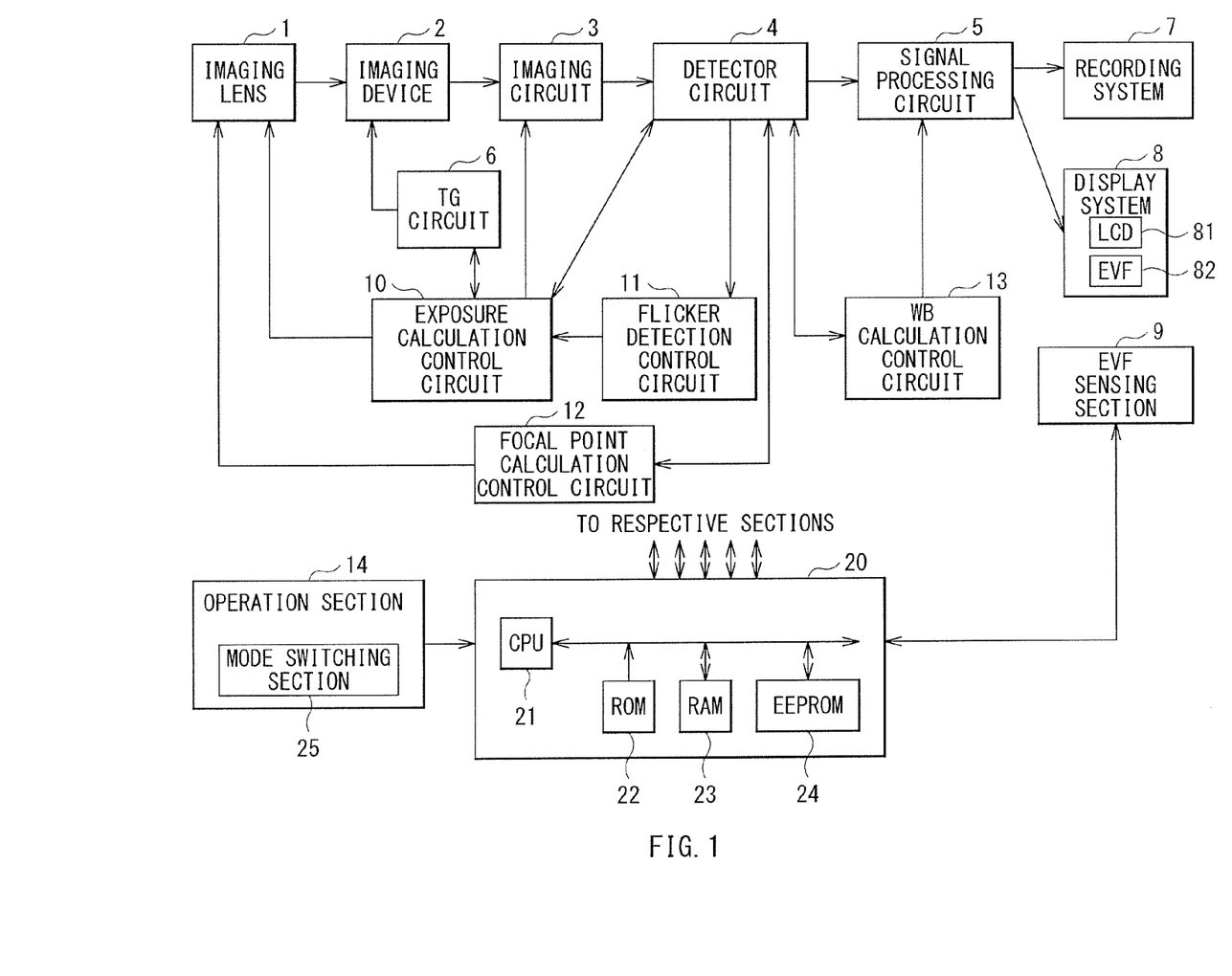
FIG. 1 is a block diagram illustrating a configuration example of an imaging apparatus according to an embodiment of the present disclosure.

An embodiment of the present disclosure will be described below in detail referring to the drawings. The description will be provided in the following order:
1. Configuration of Imaging Apparatus
2. Operation of Flicker Detection
3. Effects of Imaging Apparatus
4. Other Embodiments 1. Configuration of Imaging Apparatus FIG. 1 illustrates a configuration example of an imaging apparatus according to an embodiment of the present disclosure. The imaging apparatus includes an imaging lens 1, an imaging device 2, an imaging circuit 3, a detector circuit 4, a signal processing circuit 5, a TG (Timing Generator) circuit 6, a recording system 7, and a display system 8. The display system 8 includes an LCD (Liquid Crystal Display) 81 and an EVF (Electronic View Finder) 82. The imaging apparatus also includes an EVF sensing section 9, an exposure calculation control circuit 10, a flicker detection control circuit 11, a focal point calculation control circuit 12, a WB (White Balance) calculation control circuit 13, an operation section 14, and a control section 20. The operation section 14 includes a mode switching section 25. The control section 20 includes a CPU (Central Processing Unit) 21, a ROM (Read Only Memory) 22, a RAM (Random Access Memory) 23, and an EEPROM (Electrically Erasable Programmable Read-Only Memory) 24. The imaging apparatus may further include a shake detection section that may detect, for example, a shake of a hand or the like. The shake detection section may include a gyro sensor.

The imaging lens 1 is an imaging optical system that forms an optical image of a subject to be shot by the imaging device 2. The imaging lens 1 is configured of an optical system a focusing operation of which is adjustable. The focal point calculation control circuit 12 controls adjustment of the focusing operation of the imaging lens 1. The imaging lens 1 may further include an anti-shake optical system that may suppress, for example, image blur resulting from a shake of a hand, or the like, and the image blur resulting from a shake of a hand or the like may be suppressed by the anti-shake optical system when the shake of the hand or the like is detected by the shake detection section which is not illustrated.

The imaging device 2 outputs an electric signal based on the optical image formed on an imaging plane by the imaging lens 1. The imaging device 2 is configured of a solid-state imaging device such as a CMOS and a CCD (Charge Coupled Device). The imaging device 2 includes a plurality of pixels that are arranged two-dimensionally. The plurality of pixels each includes a photoelectric conversion device that converts light into an electric signal and outputs the electric signal.

The imaging circuit 3 performs various signal processings on the output signal from the imaging device 2, and thereby generates a digital image signal. The detector circuit 4 is configured to detect a signal value of the image signal. The signal processing circuit 5 performs various signal processings on the image signal, thereby converts the image signal into image data suitable for being recorded in the recording system 7, and outputs the image data. The signal processing circuit 5 also performs various signal processings on the image signal, thereby converts the image signal into image data suitable for being displayed on the display system 8, and outputs the image data. The WB calculation control circuit 13 adjusts white balance of the image signal.

The recording system 7 records the image data obtained by shooting in various recording media. The LCD 81 displays, for example, operation menu of the imaging apparatus, etc., or reproduces and displays the image data recorded in the recording system 7 in a reproduction mode. The LCD 81 also displays live an image during shooting in a live view mode.

The EVF 82 is a finder for a user to confirm an image being shot. The EVF sensing section 9 includes a sensor that senses a used state of the EVF 82. For example, the EVF sensing section 9 may include a sensor that senses whether or not the user is looking into the EVF 82.

The TG circuit 6 controls an imaging timing of the imaging device 2 in accordance with instructions from the control section 20 and the exposure calculation control circuit 10.

The exposure calculation control circuit 10 controls an exposure amount and an exposure timing at the time of shooting. The exposure calculation control circuit 10 is configured to control the TG circuit 6 and to variably control an exposure period of the imaging device 2 with the use of an electronic shutter, based on a result of detection of a flicker by the detector circuit 4 and the flicker detection control circuit 11. In particular, the exposure calculation control circuit 10 variably controls speed of the electronic shutter to be varied from highest speed to lower speed by a predetermined speed step within a predetermined range of speed, when an operation of detecting a flicker described later is performed.

The operation section 14 includes components such as a release button and various operation dials. The operation section 14 supplies various operation signals to the control section 20 in accordance with contents of the operation performed by a user. The content of the operation of the operation section 14 may include an operation to instruct detection of a flicker. The mode switching section 25 may instruct, for example, switching between a moving-image shooting mode and a still-image shooting mode.

The control section 20 totally controls the respective sections in the imaging apparatus. The CPU 21 executes a control program that has been stored in the ROM 22 in advance, and thereby, totally controls the respective sections. The RAM 23 temporarily stores various data. The EEPROM 24 is a rewritable non-volatile memory, and may store, for example, various setting information, etc.

2. Operation of Flicker Detection

In this imaging apparatus, the exposure period of the imaging device 2 is allowed to be variably controlled by the electronic shutter. Before explaining the operation at the time of detecting a flicker, description will be provided below on types of electronic shutters and outline of a flicker that occurs in accordance with the electronic shutter operation.

Figure 3:
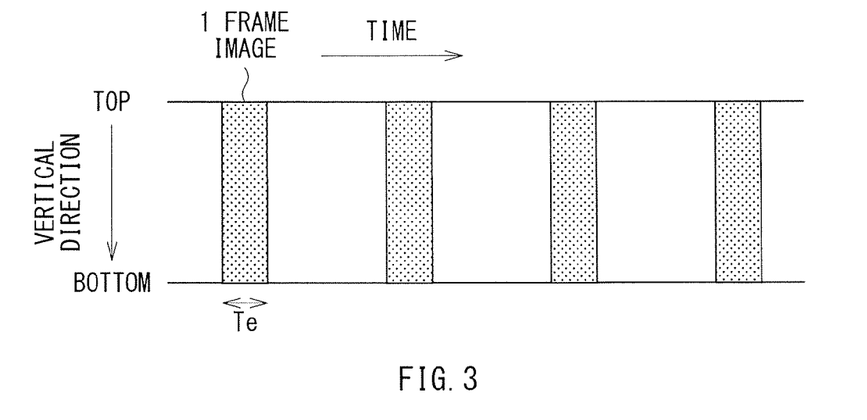
FIG. 3 is an explanation diagram illustrating a concept of an electronic shutter of a global shutter type.
Figure 4:
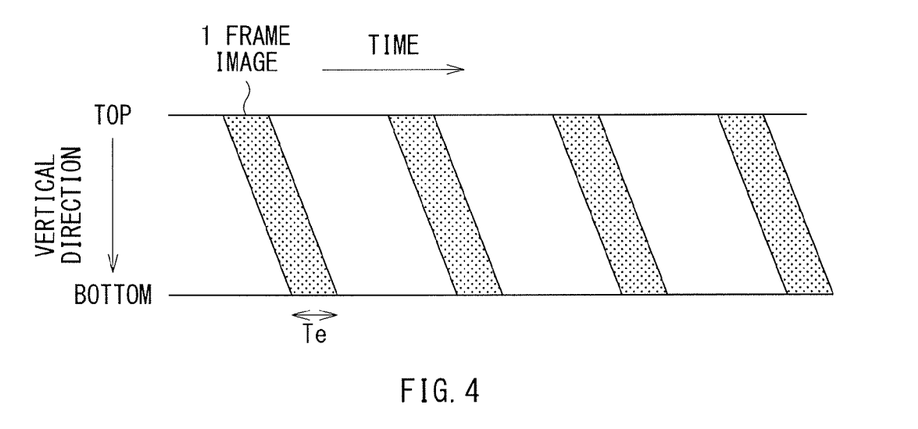
FIG. 4 is an explanation diagram illustrating a concept of an electronic shutter of a rolling shutter type.

FIG. 3 illustrates a concept of an electronic shutter of a global shutter type at the time of shooting a moving image. FIG. 4 illustrates a concept of an electronic shutter of a rolling shutter type at the time of shooting a moving image. In FIGS. 3 and 4, a lateral direction shows time, and a vertical direction shows a position in a vertical direction in the shot image.

The electronic shutter of the global shutter type performs the electronic shutter operation at the same time for all of the pixels in the imaging device 2. Therefore, as shown in FIG. 3, exposure periods Te and exposure timings are the same in all of the pixels in the electronic shutter of the global shutter type. In this case, a flicker component resulting from the light source appears as variation in luminance of the entire shot image. In this case, the flicker component is allowed to be detected, for example, based on temporal variation in average value of luminance of the entire image.

Figures 5, 6:
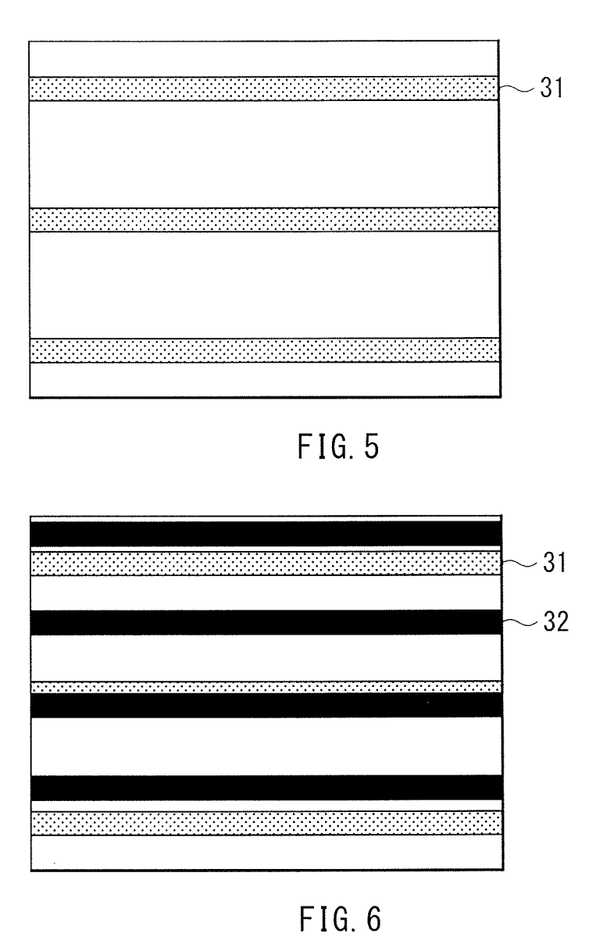
FIG. 5 is an explanation diagram illustrating an example of an image in a case where lateral stripes are caused by a flicker.
FIG. 6 is an explanation diagram illustrating an example of an image in a case where the image includes a background component having a lateral stripe pattern.
Figure 7:
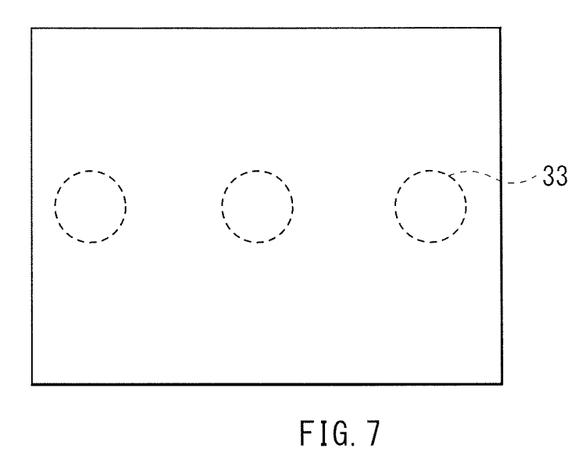
FIG. 7 is an explanation diagram illustrating an example of regions for detecting a flicker.
Figure 8:
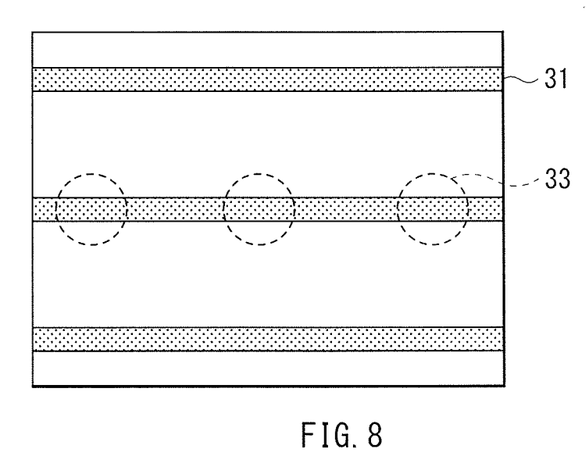
FIG. 8 is an explanation diagram illustrating an example of a relationship between lateral stripes caused by a flicker and the regions for detecting the flicker.

On the other hand, the electronic shutter of the rolling shutter type may perform the electronic shutter operation, for example, one horizontal line by one horizontal line. Therefore, as shown in FIG. 4, in the electronic shutter of the rolling shutter type, exposure timings may temporally shift, for example, one horizontal line by one horizontal time even if the exposure periods Te themselves are the same in the respective horizontal lines. In this case, for example, as shown in FIG. 5, a flicker component 31 resulting from the light source appears periodically as a lateral stripe in a particular line. In this case, for example, as shown in FIGS. 7 and 8, the flicker component is allowed to be detected, for example, based on temporal variation in signal values of a plurality of detection regions 33 arranged in a lateral direction in a two-dimensional image obtained from the output signal from the imaging device 2.

However, as shown in FIG. 6, for example, in a state where the image includes a background component 32 having a lateral stripe pattern, detection error may occur between the flicker component 31 and the background component 32. Therefore, in the present embodiment, a flicker is detected in a state where the focal point calculation control circuit 12 serving as a focus control section allows a focusing operation to be performed in a direction, out of an infinite distance direction and a closest distance direction, that allows the optical image of the subject to be blurred most. Thus, detection error caused by the background component 32 is suppressed.

Figure 2:
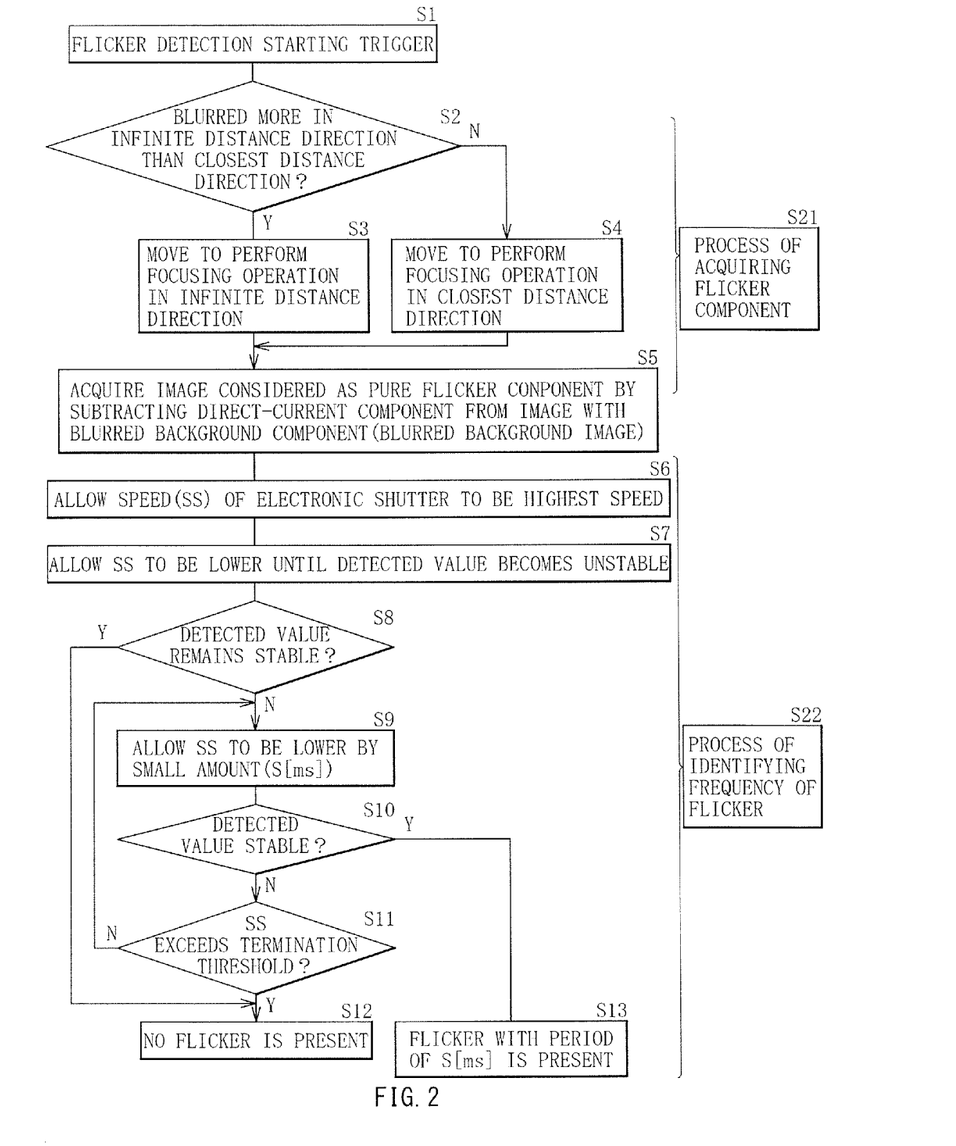
FIG. 2 is a flow chart showing an example of an operation of the imaging apparatus for detecting a flicker.

FIG. 2 illustrates an example of an operation at the time of detecting a flicker in this imaging apparatus. The operation at the time of detecting a flicker includes a process of acquiring an image of a flicker component (step S21), and a process of identifying frequency of a flicker (step S22). These processes are performed when a flicker detection starting trigger occurs (step S1). The control section 20 may determine that the flicker detection starting trigger has occurred, for example, in the following cases, and the control section 20 allows the respective sections to perform the operation at the time of detecting a flicker. The operation at the time of detecting a flicker includes a process of defocusing, and a process of forcibly varying the speed of the electronic shutter from high speed to lower speed. Therefore, an output image temporarily becomes turbulent, although for a short time. Therefore, it is possible to determine that the flicker detection operation is performed based on the output image. Accordingly, for example, by performing detection of a flicker only in the following cases, it is possible to reduce influence on actual shooting. It is to be noted that "c) at the time when the shooting mode is switched" may refer to, for example, at the time when shooting mode is switched from a still-image shooting mode to a moving-image shooting mode. In the case of d), when the signal value varies largely despite no shake of a hand, etc., it is determined that a flicker is more likely to be caused, and the flicker detection is performed. "e) in a state of reproducing mode" refers to a mode of reproducing and displaying the image data recorded in the recording system 7.

a) in a case where a user has performed an operation to instruct detection of a flicker via the operation section 14
b) in a case where the EVF 82 is not used, for example, in a case where it is determined that the user is not looking into the EVF 82 (in a case where the EVF sensing section 9 does not sense that the user is looking into the EVF 82)
c) at the time when the shooting mode is switched
d) at the time when the gyro sensor is stable and the signal value varies largely
e) in a state of reproducing mode When the flicker detection starting trigger occurs (step S1), the focal point calculation control circuit 12 serving as the focus control section controls the imaging lens 1 to allow the imaging lens 1 to perform a focusing operation in a direction, out of the infinite distance direction and the closest distance direction, in which the optical image of the subject is blurred most. In this case, first, the focal point calculation control circuit 12 determines which of the infinite distance direction and the closest distance direction is the direction in which the optical image of the subject is blurred most, based on a current focus position of the subject (step S2). When the focal point calculation control circuit 12 determines that the infinite distance direction is the direction in which the optical image of the subject is blurred (step S2; Y), the focal point calculation control circuit 12 allows the imaging lens 1 to move to perform a focusing operation in the infinite distance direction (step S3). When the focal point calculation control circuit 12 determines that the closest distance direction is the direction in which the optical image of the subject is blurred (step S2; N), the focal point calculation control circuit 12 allows the imaging lens 1 to move to perform a focusing operation in the closest distance direction (step S4). Thus, a state with the blurred background component 32 as shown in FIG. 6 is created. The detector circuit 4 and the flicker detection control circuit 11 subtract a direct-current component (the blurred background image) from the image having the blurred background component 32, and thereby, acquire an image that is considered to be a pure flicker component (step S5).

Next, the exposure calculation control circuit 10 controls the TG circuit 6, and allows speed (SS) of the electronic shutter to be highest speed within a predetermined operable range of speed (step S6). The detector circuit 4 and the flicker detection control circuit 11 detect, as necessary, variation in the signal value when the speed (SS) of the electronic shutter is varied. For example, the electronic shutter of the rolling shutter type may detect, as necessary, temporal variation in the signal values in the detection regions 33 that may be provided, for example, as shown in FIGS. 7 and 8. The exposure calculation control circuit 10 controls the TG circuit 6, and allows the speed (SS) of the electronic shutter to be lower by a predetermined speed step until the detected value becomes unstable in terms of time (step S7). For example, the exposure calculation control circuit 10 allows the speed (SS) of the electronic shutter to be lower until the temporal variation in the detected value may become, for example, as a large value→a small value→a large value. When the detected value is remained temporally stable in the predetermined operable range of speed (step S8; Y), the flicker detection control circuit 11 determines that no flicker is present (step S12).

On the other hand, when the detected value becomes temporally unstable (step S8; N), the exposure calculation control circuit 10 controls the TG circuit 6, and allows the speed (SS) of the electronic shutter to be further lower by the predetermined speed step (step S9). At this time, the speed (SS) of the electronic shutter is assumed to be S [ms]. When the detected value becomes temporally stable in a case where the speed (SS) of the electronic shutter is set to S [ms] (step S10; Y), the flicker detection control circuit 11 determines that a flicker having a period of S [ms] is present (step S13). By setting the speed (SS) of the electronic shutter based on the frequency of the flicker that has been determined in such a manner, it is possible to shoot a flickerless moving image.

When the detected value becomes temporally unstable in a case where the speed (SS) of the electronic shutter is set to S [ms] (step S10; N), and when the speed (SS) of the electronic shutter exceeds a termination threshold (step S11; Y), the flicker detection control circuit 11 determines that no flicker is present (step S12). When the speed (SS) of the electronic shutter is not over the termination threshold (step S11; N), the process returns to the process in step S9. It is to be noted that "termination threshold" is a lower limit of the predetermined range of speed in which the shutter is operable as an electronic shutter.

Some reasons for determining the frequency of the flicker by varying the speed of the electronic shutter from high speed to lower speed in such a manner may be as follows.

Generally, it is desirable that an adoptable range as shutter speed is larger in order to perform appropriate exposure under various environments having different brightness. When a period of the power source that causes a flicker is T [sec], all values of constant multiples (T/2, T, 3T/2, 2T, ...) of T/2 [sec] correspond to shutter speed that achieves a flickerless state (a state in which a flicker disappears). Therefore, it is important to determine the value of T/2. One reason for varying the shutter speed from high speed to lower speed when determining the frequency of the flicker as described above is because the shutter speed achieving a flickerless state that is firstly found is the exposure period of T/2 in a case where the range of the shutter speed at the time of detection is sufficiently large.

3. Effects of Imaging Apparatus

According to the present embodiment, a flicker is detected by varying the speed of the electronic shutter from high speed to lower speed in such a manner. Therefore, accuracy in detection of a flicker is improved. Accordingly, for example, it is possible to detect a flicker caused by a high-frequency light source such as an LED. Also, according to the present embodiment, the flicker detection is performed in a state where the focusing operation is performed in a direction in which the optical image of the subject is blurred most. Therefore, it is possible to achieve robust flicker detection independent of the background component such as lateral stripes. It is possible to suppress detection error of a flicker that may be caused, for example, by a vertical movement of a subject that has a lateral-stripe-like pattern, a vertical movement of a camera, etc. Also, the operation at the time of detecting a flicker is performed based on a particular flicker detection starting trigger. Therefore, a flicker is automatically detected at a timing which gives less unfavorable influence on a user. Accordingly, it is possible to easily achieve shooting of a flickerless moving image.

4. Other Embodiments

The technology according to the present disclosure is not limited to the description of the above embodiment, and various modifications may be made.

It is possible to achieve at least the following configurations from the above-described example embodiments and the modifications of the disclosure:

(1) An imaging apparatus including:
an imaging device configured to convert light into an electric signal and to output the electric signal;
an exposure control section configured to variably control an exposure period of the imaging device with use of an electronic shutter; and
a flicker detection section configured to detect a flicker based on variation in an output signal from the imaging device when speed of the electronic shutter is varied from relatively-high speed to relatively-low speed.

(2) The imaging apparatus according to (1), wherein
the exposure control section is allowed to variably control the speed of the electronic shutter within a predetermined range of speed, and
the flicker detection section detects the flicker based on variation in the output signal from the imaging device when the speed of the electronic shutter is varied, within the predetermined range of speed, from highest speed to lower speed by a predetermined speed step.

(3) The imaging apparatus according to (1) or (2), further including:
an imaging optical system configured to form an optical image of a subject to be shot by the imaging device; and
a focus control section configured to adjust a focusing operation of the imaging optical system, wherein
the flicker detection section detects the flicker in a state where the focus control section allows the imaging optical system to perform a focusing operation in a direction, out of an infinite distance direction and a closest distance direction, in which the optical image of the subject is blurred most.

(4) The imaging apparatus according to any one of (1) to (3), wherein
the exposure control section variably controls the exposure period of the imaging device with use of an electronic shutter of a rolling shutter type, and
the flicker detection section detects the flicker based on variation in signal values of a plurality of regions arranged in a lateral direction in a two-dimensional image obtained from the output signal from the imaging device.

(5) The imaging apparatus according to any one of (1) to (4), further including:
an electronic view finder; and
a finder sensing section configured to sense a used state of the electronic view finder, wherein
the flicker detection section detects the flicker when the electronic view finder is not used.

(6) The imaging apparatus according to any one of (1) to (5), further including a mode switching section configured to perform switching between a moving-image shooting mode and a still-image shooting mode, wherein
the flicker detection section detects the flicker when the mode switching section performs switching to the moving-image shooting mode.

(7) A method of detecting a flicker, the method including:
variably controlling an exposure period of an imaging device with use of an electronic shutter; and
detecting a flicker based on variation in an output signal from the imaging device when speed of the electronic shutter is varied from relatively-high speed to relatively-low speed.

(8) An information processing unit including:
an exposure control section configured to variably control an exposure period of an imaging device with use of an electronic shutter; and a flicker detection section configured to detect a flicker based on variation in an output signal from the imaging device when speed of the electronic shutter is varied from relatively-high speed to relatively-low speed.

It should be understood by those skilled in the art that various modifications, combinations, sub-combinations, and alterations may occur depending on design requirements and other factors insofar as they are within the scope of the appended claims or the equivalents thereof.

What is claimed is:

1. An imaging apparatus comprising:
   an imaging device configured to convert light into an electric signal and to output the electric signal;
   an exposure control section configured to variably control an exposure period of the imaging device with use of an electronic shutter; and
   a flicker detection section configured to detect a flicker based on variation in an output signal from the imaging device when speed of the electronic shutter is varied from relatively-high speed to relatively-low speed.

2. The imaging apparatus according to claim 1, wherein
   the exposure control section is allowed to variably control the speed of the electronic shutter within a predetermined range of speed, and
   the flicker detection section detects the flicker based on variation in the output signal from the imaging device when the speed of the electronic shutter is varied, within the predetermined range of speed, from highest speed to lower speed by a predetermined speed step.

3. The imaging apparatus according to claim 1, further comprising:
   an imaging optical system configured to form an optical image of a subject to be shot by the imaging device; and
   a focus control section configured to adjust a focusing operation of the imaging optical system, wherein
   the flicker detection section detects the flicker in a state where the focus control section allows the imaging optical system to perform a focusing operation in a direction, out of an infinite distance direction and a closest distance direction, in which the optical image of the subject is blurred most.

4. The imaging apparatus according to claim 1, wherein
   the exposure control section variably controls the exposure period of the imaging device with use of an electronic shutter of a rolling shutter type, and
   the flicker detection section detects the flicker based on variation in signal values of a plurality of regions arranged in a lateral direction in a two-dimensional image obtained from the output signal from the imaging device.

5. The imaging apparatus according to claim 1, further comprising:
   an electronic view finder; and
   a finder sensing section configured to sense a used state of the electronic view finder, wherein
   the flicker detection section detects the flicker when the electronic view finder is not used.

6. The imaging apparatus according to claim 1, further comprising
   a mode switching section configured to perform switching between a moving-image shooting mode and a still-image shooting mode, wherein
   the flicker detection section detects the flicker when the mode switching section performs switching to the moving-image shooting mode.

7. A method of detecting a flicker, the method comprising:
   variably controlling an exposure period of an imaging device with use of an electronic shutter; and
   detecting a flicker based on variation in an output signal from the imaging device when speed of the electronic shutter is varied from relatively-high speed to relatively-low speed.

8. An information processing unit comprising:
   an exposure control section configured to variably control an exposure period of an imaging device with use of an electronic shutter; and
   a flicker detection section configured to detect a flicker based on variation in an output signal from the imaging device when speed of the electronic shutter is varied from relatively-high speed to relatively-low speed.

9. The imaging apparatus according to claim 1, wherein the flicker detection section is configured to acquire an image considered to be a flicker component by subtraction of a blurred background image from an image having a blurred background component.

* * * * *